(12) United States Patent
Sigmundstad

(10) Patent No.: US 6,390,478 B1
(45) Date of Patent: *May 21, 2002

(54) SEALING ARRANGEMENT FOR A SWIVEL

(75) Inventor: Martin Sigmundstad, Hafrsfjord (NO)

(73) Assignee: Den Norske Stats Oljeselskap A.S., Stavanger (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/578,636
(22) PCT Filed: Jul. 5, 1994
(86) PCT No.: PCT/NO94/00120
    § 371 Date: Jun. 27, 1996
    § 102(e) Date: Jun. 27, 1996
(87) PCT Pub. No.: WO95/02145
    PCT Pub. Date: Jan. 19, 1995

(30) Foreign Application Priority Data

Jul. 6, 1993 (NO) .................................................. 932461

(51) Int. Cl.⁷ ................................................. F16J 15/34
(52) U.S. Cl. ...................... 277/362; 277/395; 285/98; 285/106; 285/136
(58) Field of Search ............................ 277/2, 6, 27, 16, 277/95, 422, 431, 432, 407, 362, 387, 395, 332, 343; 285/136, 106, 96, 98

(56) References Cited

U.S. PATENT DOCUMENTS

| | | | | |
|---|---|---|---|---|
| 2,310,309 A | * | 2/1943 | Orr | 277/907 |
| 2,577,858 A | * | 12/1951 | Sampson | 285/136 |
| 2,768,843 A | | 10/1956 | Zeilman | |
| 2,877,026 A | * | 3/1959 | Payne et al. | 285/136 |
| 3,021,146 A | * | 2/1962 | Sommer et al. | 277/907 |
| 3,122,373 A | * | 2/1964 | Lee et al. | 277/3 |
| 3,351,360 A | * | 11/1967 | Faccou | 285/136 |
| 4,294,454 A | * | 10/1981 | Cannings | 277/907 |
| 4,647,076 A | | 3/1987 | Pollack et al. | |
| 4,662,657 A | * | 5/1987 | Harvey et al. | 285/96 |
| 4,669,758 A | * | 6/1987 | Feller et al. | 285/136 |
| 4,683,912 A | * | 8/1987 | Dubrosky | 285/136 |
| 4,819,966 A | * | 4/1989 | Gibb | 285/136 |
| 4,890,849 A | * | 1/1990 | Eason | 277/422 |
| 4,925,219 A | | 5/1990 | Pollack et al. | |
| 5,411,298 A | * | 5/1995 | Pollack | 285/106 |

FOREIGN PATENT DOCUMENTS

| | | |
|---|---|---|
| DE | 3725222 | 2/1989 |
| EP | 0 144 110 | 6/1985 |
| EP | 0 150 591 | 8/1985 |
| EP | 0 154 395 | 9/1985 |
| GB | 1 557 108 | 12/1979 |
| GB | 2 132 726 | 7/1984 |
| GB | 2 163 505 | 7/1984 |

* cited by examiner

Primary Examiner—Daniel G. DePumpo
(74) Attorney, Agent, or Firm—Foley & Lardner

(57) ABSTRACT

A sealing arrangement for a swivel (1) comprising inner and outer mutually rotatable swivel members (2, 3), wherein the swivel members have respective inner fluid paths communicating with each other through one or more associated annular spaces (7) at the interface between the swivel members. A first one (3) of the swivel members on each side of the annular space (7) is provided with a peripheral groove (16) receiving a radially displaceable ring element (17) provided with sealing means (18, 19) which are arranged for static sealing against the other swivel member (2) and for dynamic sealing between the ring element (17) and the side walls of the peripheral groove (16), so that the first swivel member (3) apart from the ring elements (17) is rotatable in relation to the other swivel member (2).

7 Claims, 4 Drawing Sheets

SEALING ARRANGEMENT FOR A SWIVEL

The present invention relates to a sealing arrangement for a swivel comprising inner and outer mutually rotatable swivel members, wherein the swivel members have respective inner fluid paths communicating with each other through one or more associated annular spaces at the interface between the swivel members, the annular spaces being mutually sealed by means of sealing means.

Many different embodiments of swivel structures of the above mentioned type are in use within the industry. Within the offshore industry, swivel devices are used for example to allow of transfer of hydrocarbons (oil and gas) or another process fluid through coupling members which rotate or are to be rotatable in relation to each other, for example between a marine riser which is connected to a floating loading buoy, and a tube system on a tanker which is connected to the buoy and is to be rotatable about the buoy under the influence of wind, waves and water currents.

In different fields of use it may be of interest to use swivel devices which are constructed in such a manner that the inner and outer swivel members in a simple manner can be disconnected from each other, and wherein a swivel member later can be connected to a cooperating swivel member in another swivel device of the topical type, to form an operative swivel unit. It will here be of essential importance that the swivel members can be disconnected from or connected to each other in a simple, quick and safe manner, at the same time as an efficient and safe sealing between the swivel members is achieved.

Thus, it is an object of the invention to provide a sealing arrangement for a swivel of the topical type, which enables a quick and safe interconnection of the swivel members, and simultaneously an efficient and safe sealing between the annular spaces of the swivel members.

A simultaneous object of the invention is to provide such a sealing arrangement which results in that cooperating swivel members can be interconnected in a simple and quick manner in spite of relatively large tolerance deviations or center displacements between the swivel members, and with a minimal risk for damaging the swivel members.

A further object is to provide a sealing arrangement giving the possibility for a simple monitoring of static as well as dynamic seals, a barrier liquid having a higher pressure than the ambient pressure being used.

For the achievement of the above-mentioned object there is provided a sealing arrangement for a swivel of the introductorily stated type which, according to the invention, is characterized in that a first one of the swivel members on each side of the annular space or spaces is provided with a peripheral groove receiving a radially displaceable ring element which is provided with sealing means arranged for static sealing against the other swivel member and for dynamic sealing between the ring element and the side walls of the peripheral groove, so that the first swivel member apart from the ring elements is rotatable in relation to the other swivel member.

By means of the stated ring element structure there is achieved that the ring elements of the swivel center themselves between the swivel members within relatively large tolerances. This is achieved in that the ring elements are able to float freely in the radial direction and thus will absorb possible center deviations or center displacements between the swivel members.

An advantageous embodiment of the invention is characterized in that the sealing means are arranged to be operated hydraulically by means of barrier liquid having a higher pressure than that of the fluid against which it is to be sealed, the first swivel member being provided with a supply channel for the barrier liquid. By using a barrier liquid having a higher pressure than the ambient pressure, there is obtained a controlled leakage path in the direction from the barrier liquid to the topical process fluid, i.e. from a clean to a "dirty" medium. The barrier liquid suitably may be a hydraulic oil which then simultaneously has a lubricating effect, and the sealing surfaces may be protected by allowing very small quantities of clean barrier fluid to leak out into "the process". By controlling the volume of barrier liquid over time, one will obtain an early warning about a possible leakage or other changes in the system.

The invention will be further described below in connection with exemplary embodiments with reference to the accompanying drawings, wherein FIG. 1 shows an axially sectioned view of a swivel device which is provided with a sealing arrangement according to the invention, and wherein the swivel members are shown in interconnected condition;

Figure 1:
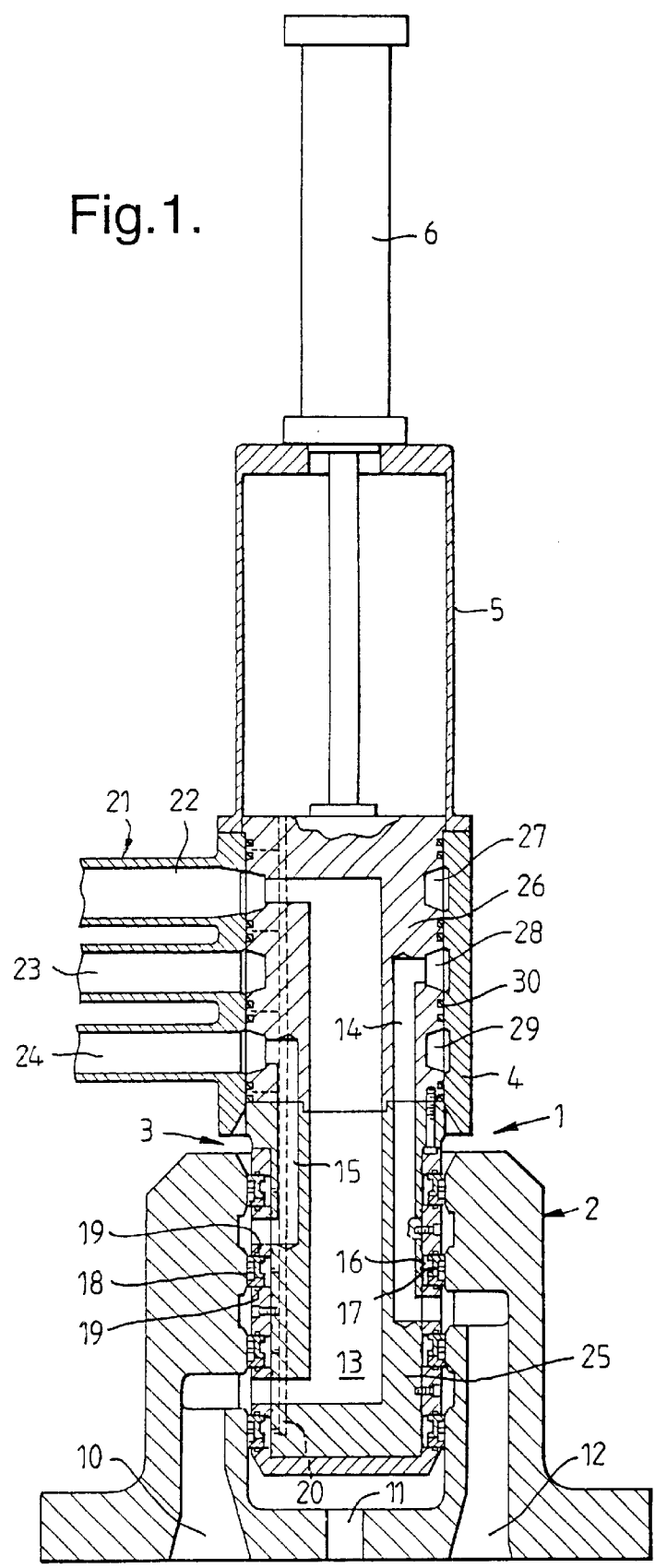
Figure 2:
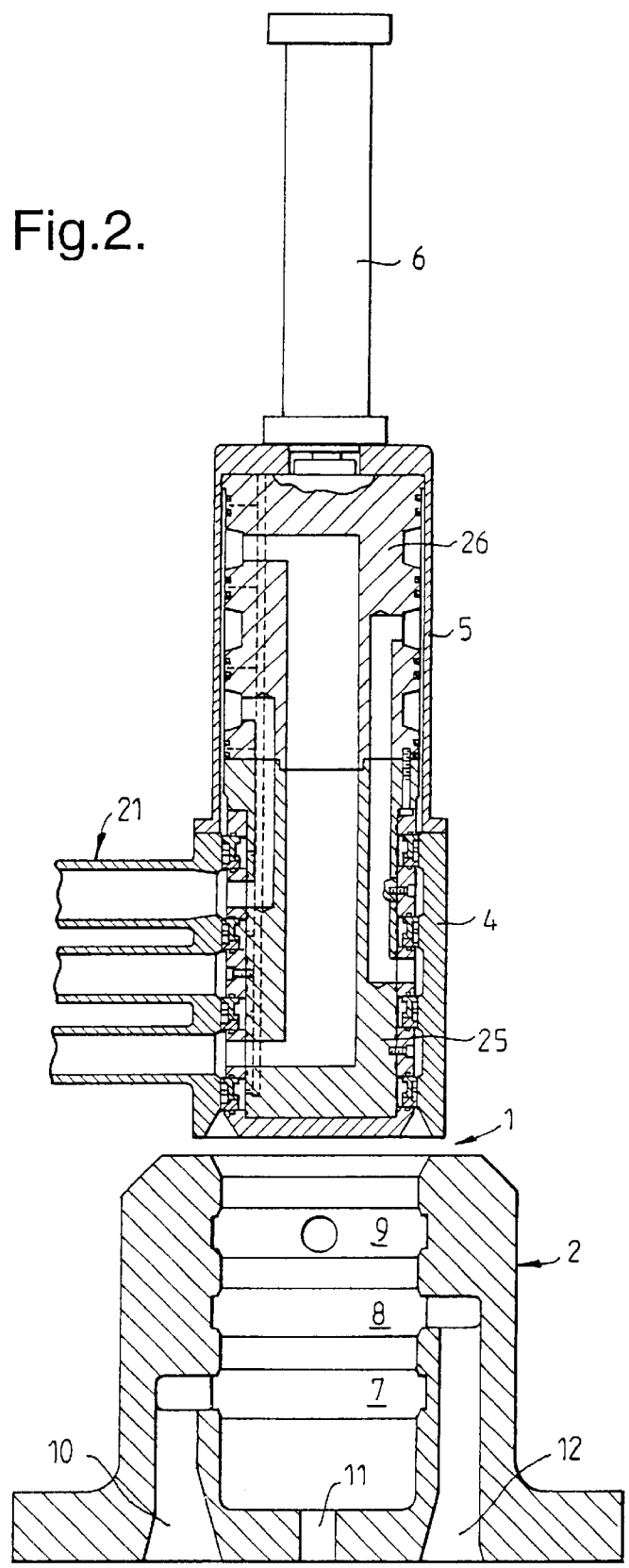
FIG. 2 shows a corresponding sectional view as in FIG. 1, but with the swivel members in mutually disconnected condition.

The swivel device shown in FIGS. 1 and 2 is especially intended for use on a vessel for offshore production of hydrocarbons, wherein the vessel has a submerged downwardly open receiving space for receiving a submerged buoy which is anchored to the sea bed and is connected to a number of risers extending between the buoy and a production well at the sea bed. The swivel device here provides for interconnection between the risers and a tube system on the vessel, the coupling simultaneously allowing a turning of the vessel about the buoy under the influence of wind, waves and water currents, as mentioned in the introduction. Even if the invention hereinafter will be described in connection with this field of application, it will be appreciated that the invention may also be used on swivel devices of a similar type in different other fields of application.

The swivel device 1 shown in FIGS. 1–2 consists of an outer swivel member or female member 2 and an inner swivel member or male member 3 which may be lowered into or lifted up from the female member 2. The female member 2 in this case is intended for permanent mounting on the center member of a submerged buoy (not shown), whereas the male member 3 is shown to be slidably mounted in a guide sleeve 4 which is suitably supported on the topical vessel and which forms a fluid connection between the swivel device and a tube system (not shown) on the vessel. The arrangement in connection with the buoy and in connection with manipulation of the male member and connection to the tube system of the vessel does not form part of the present invention, and therefore will not be further described. It is here only to be mentioned that the guide sleeve 4 as shown supports a housing 5 which is intended to receive an upper part of the male member 3 when this is in the raised position (FIG. 2). The housing 5 supports an operating means 6 for raising and lowering of the male member 3. The operating means 6 suitably is a hydraulic actuator, e.g. a cylinder/piston means as shown.

In connected condition the swivel members 2, 3 in a conventional manner form common annular spaces communicating with associated fluid paths in the swivel members. The number of annular spaces and fluid paths is dependent on the need in the topical case. In the illustrated example there are arranged three annular spaces 7, 8, 9 communicating with a separate one of three fluid paths 10, 11, 12 in the female member 2, and with a separate one of three fluid paths 13, 14, 15 in the male member 3. In the illustrated case the annular spaces are formed by peripheral annular channels formed in the female member 2, but they may alternatively be formed in the male member 3, or also in both members, for example for forming annular spaces having an essentially circular cross-section.

In the illustrated embodiment the male member 3 on each side of each of the annular spaces is provided with a peripheral ring groove 16 receiving a radially movable ring element 17. Alternatively, the ring grooves and ring elements may be placed in the female member. The ring element 17 is provided with sealing means 18, 19 which are arranged for static sealing against the female member and for dynamic sealing between the ring element 17 and the side walls of the peripheral ring groove 16, respectively. This sealing means can be activated to form a seal between the annular spaces during operation, and can be relieved in case of mutual disconnection of the swivel members 2, 3. The sealing means suitably are arranged to be operated hydraulically by means of a barrier liquid having a higher pressure than the ambient pressure, i.e. the pressure of the fluid against which it is to be sealed. The barrier fluid is supplied through a suitable supply channel 20 arranged in the swivel member which is provided with the ring grooves 16, i.e. in the illustrated case the male member 3. As shown more clearly in FIG. 3, the supply channel 20 for barrier liquid debouches in a buffer volume which is delimited by the bottom area of the ring groove 16 and the associated ring element 17, and which communicates with the sealing means 18, 19 of the ring element. Thus, when the sealing means are activated, the male member 3, apart from the ring element 17, is rotatable in relation to the female member 2. The construction and manner of operation of the sealing means will be further described with reference to FIG. 3.

As appears from FIGS. 1 and 2, the ring elements 17 have a larger outer diameter than the rest of the inner swivel member 3, the outer diameter of the ring elements essentially corresponding to the inner diameter of the outer swivel member 2. By means of this ring element structure one achieves that the ring elements 17 center themselves within the female member within relatively large tolerances, e.g. ±12 mm. This is possible since the ring elements may float freely in the radial direction and thus may absorb possible center deviations or center displacements between the female member and the male member.

As mentioned above, the male member 3 is slidably mounted in the guide sleeve 4. The guide sleeve is fastened to a channel means 21 in the form of three tubes 22, 23, 24 which, in a manner not further shown, are connected to said tube system on the vessel. The male member comprises a lower stab-in part 25 and a top part 26, and the top part is situated in the guide sleeve 4 when the stab-in part is introduced into the female member 2, as appears from FIG. 1. In this position the guide sleeve 4 and the top part 26 define three common annular spaces 27, 28, 29 communicating with respective ones of the fluid paths 13, 14, 15 of the male member 3 and with said tubes 22, 23, 24, the guide sleeve 4 having through holes between the annular spaces and the associated tubes. Between the annular spaces the top part 26 is provided with hydraulically actuated static sealing means 30 corresponding to the sealing means 18 and which are activated by the barrier liquid through the supply channel 20.

Figure 3:
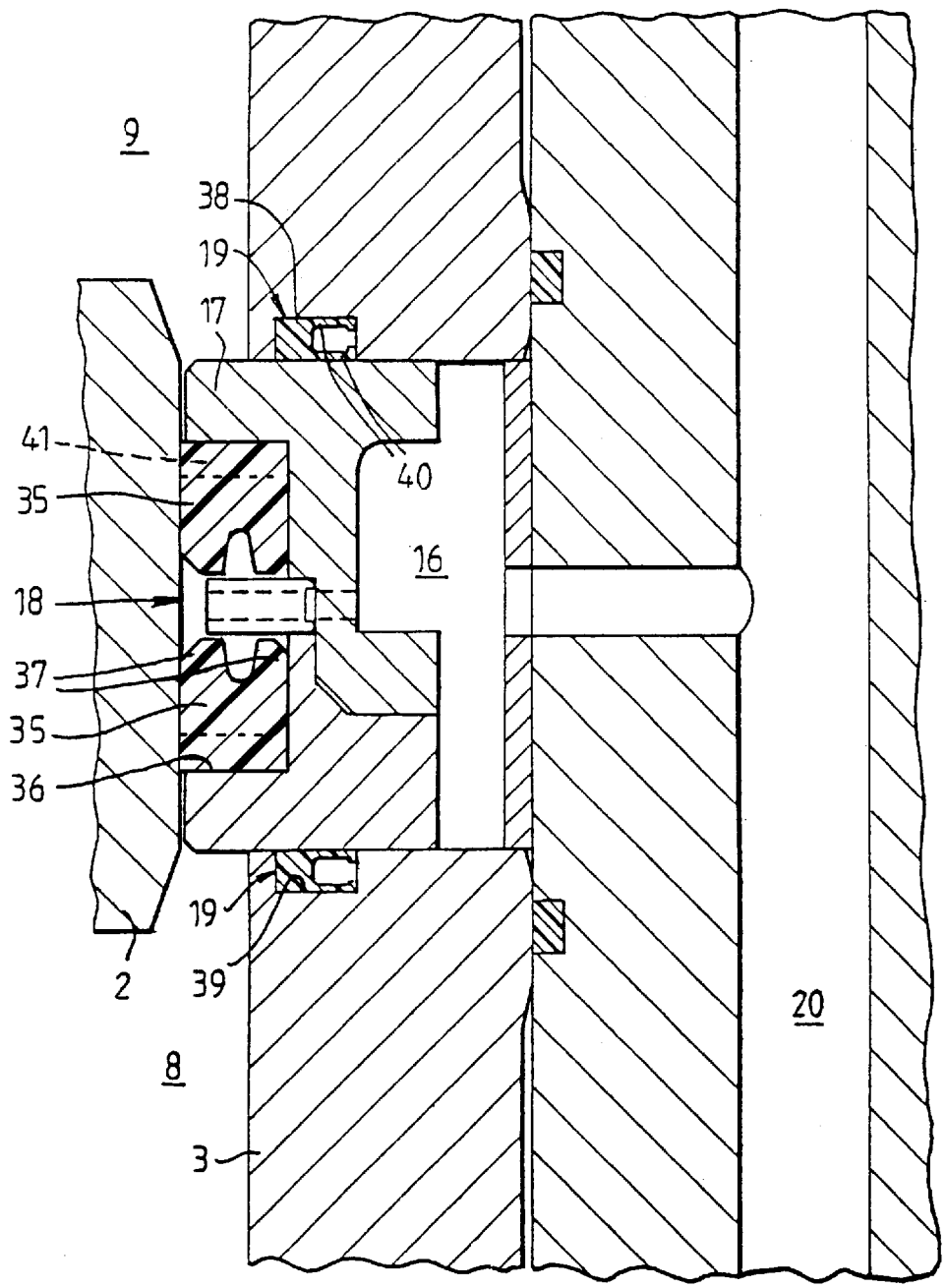
FIG. 3 shows an enlarged cross-sectional view of an embodiment of the static and dynamic sealing means according to the invention.

An embodiment of the static and dynamic sealing means is shown more in detail in FIG. 3. The figure shows a segment of the female member 2 and the stab-in part 25 of the male member 3, with the members in interconnected position and shown in longitudinal section through the axis of the swivel device, as shown in FIG. 1.

The static sealing means 18 consist of a pair of U-shaped lip seals 35 which are placed in a peripheral groove 36 in the ring element 17 which may also be called a static seal housing. The ring element consists of a pair of steel rings which are assembled and fastened to each other as shown in the Figure, so that the sealing elements can be placed in the groove 36 before the steel rings are mounted to each other. The U-shaped lip seals consist of a suitable elastomeric material and have axially directed legs 37, wherein the outer leg under the influence of the barrier liquid is pressed outwards to frictionally locking engagement with the opposite sealing surface of the female member 2. As mentioned, the barrier liquid is supplied through the supply channel 20 and the buffer volume at the bottom of the ring groove 16, the ring element 17 being provided with suitable openings for this purpose.

Each of the elastomeric sealing elements 35 is provided with an embedded supporting ring 41 (suggested with dashed lines), in order to prevent extrusion of sealing element material between mutually adjacent sealing surfaces, under pressure influence from the barrier liquid.

The dynamic sealing means 19 also consists of a pair of elastomeric U-shaped lip seals 38, but these sealing elements are placed in separate ring grooves 39 in the side walls of the peripheral ring groove 16, since they are to form a seal between the ring element 17 and the adjacent portion of the male member 3 in case of rotation thereof in the female member 2. The U-shaped sealing elements 38 have radially directed legs 40 which, under the influence of the barrier liquid, are pressed to dynamic sealing against the ring element 17 and the ring grooves 39, respectively.

The sealing elements 38 will also be provided with similar supporting rings (not shown) as those mentioned for the sealing elements 35, to prevent extrusion of sealing material.

When the male member and the female member are in the interconnected position, the ring elements 17 as mentioned have centered themselves within the female member, the elements being freely movable in the radial direction. The barrier liquid (e.g. hydraulic oil or water) is pressurized, and the barrier liquid pressure forces the static sealing elements 35 to expand against the sealing surface of the female member and locks the ring elements or seal housings in their position. As regards the dynamic seal, a small gap between the sealing surfaces of the ring element 17 and the ring groove 16 leads the barrier liquid to the sealing element 38. The pressure difference between the barrier liquid and the process fluid brings the sealing element into firm contact with the sealing surface of the ring element.

Thus, when the sealing means 18 and 19 are activated, the static sealing elements 35 lock the ring elements 17 frictionally to the female member 2, whereas the adjacent side walls of the ring elements 17 and the ring grooves 16 form mutually movable sliding surfaces which are sealed by means of the dynamic sealing elements 38. For the sealing function of the static seal it is of decisive importance that a firm and strong frictional fastening is achieved between the sealing element and the sealing surface of the female member. Movement of the sealing element and the female member will cause a leakage because of the large pressure differences across the seal. The pressure and the coefficient of friction will be decisive, and as sealing material one will choose an elastomeric material giving the largest possible friction. For the dynamic seal, on the other hand, one will choose an elastomeric material giving a low friction between the sliding surfaces, to obtain a good seal with a low friction.

When the male member and the female member are to be disconnected from each other, the barrier fluid pressure is relieved, so that the ring elements 17 are no longer locked in their position. The male member may now be withdrawn from the female member. Even if the sealing elements during this operation are relieved, they are still in contact with their sealing surfaces.

Figure 4:
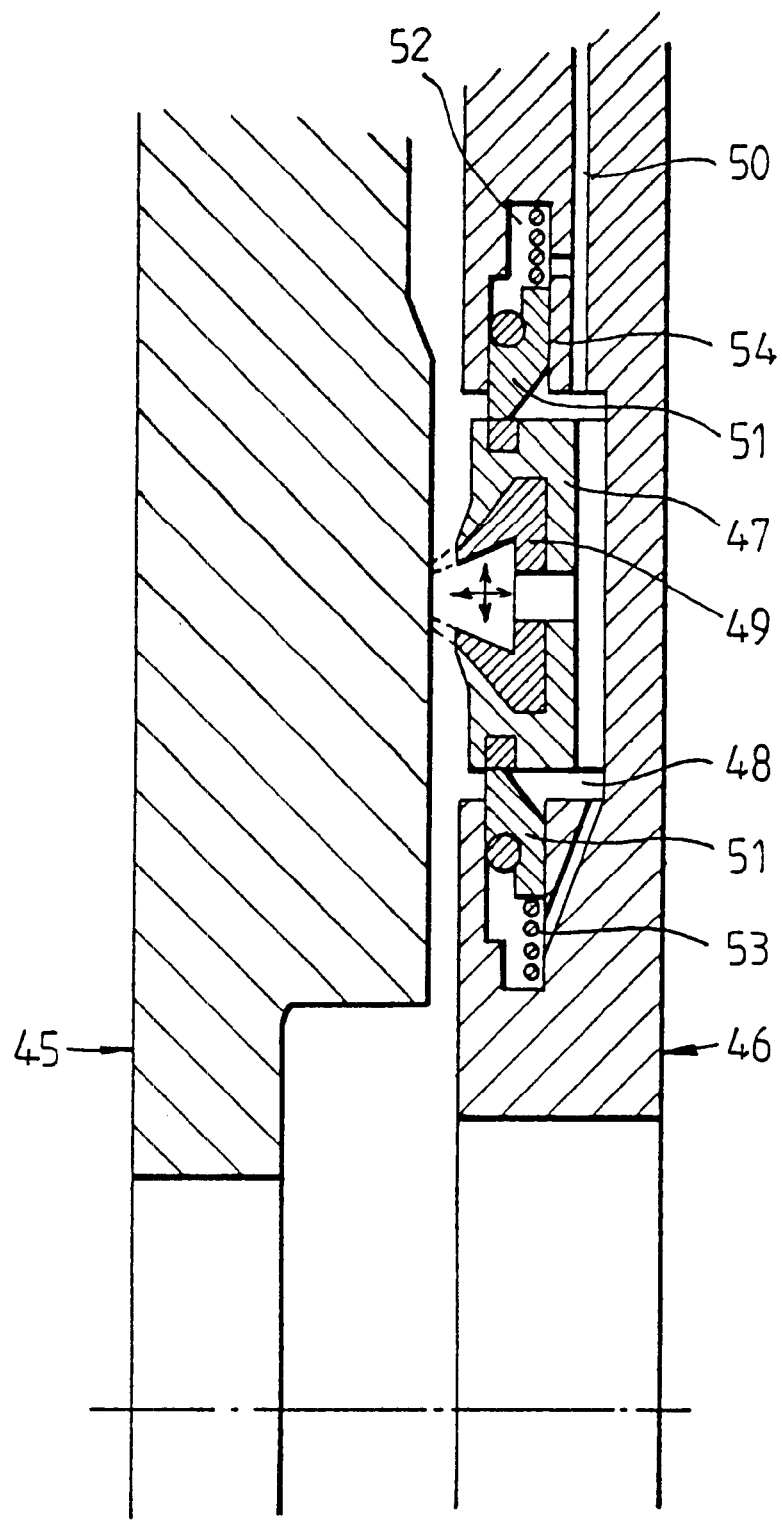
FIG. 4 shows an enlarged cross-sectional view of another embodiment of the static and dynamic sealing means according to the invention.

An alternative embodiment of a ring element and sealing assembly is shown in FIG. 4. In the Figure, interspace distances and clearances between individual elements are strongly exaggerated for the sake of clarity. In a manner corresponding to that in FIG. 3 there is shown a segment of a female member 45 and the stab-in part of a male member 46 with the members in interconnected position, and shown in longitudinal section through the axis of the swivel device. In this embodiment a radially movable ring element 47 is arranged in a peripheral ring groove 48 in the male member 46. In the ring element there is placed a static sealing means in the form of U-shaped lip seal element 49 having lips which are directed towards the adjacent sealing surface of the female member 45. Barrier liquid is supplied through a channel 50 to a buffer volume at the bottom of the ring groove 48. When the barrier liquid is pressurized, the sealing lips are pressed outwards to frictionally locking engagement with the opposite sealing surface of the female member.

The dynamic sealing means here consists of a pair of sealing elements 51 which are sealingly placed in respective ring grooves 52 on each side of the ring element 47, in sealing engagement with an adjacent sealing surface of the ring element. As shown, each ring groove 52 is connected to the supply channel 50 for barrier liquid. In the bottom portion of the ring groove there is also placed a pressure spring 53 acting on the sealing element in addition to the pressure from the barrier liquid. Further, each sealing element 51 is acted upon and retained by an O-ring 54 placed in the ring groove.

As will be seen by a person skilled in the art, in the sealing surface between the sealing elements 61 and the adjacent abutment or seating surface of the ring element 57, there will be established a force balance between the "closing" forces represented by the force from the spring 63 and the hydraulic force due to the barrier liquid pressure, and the "opening" forces represented by the hydraulic force due to the process fluid pressure and the barrier liquid pressure. With a suitable configuration of the sealing element 61 with respect to choice of diameter of the abutment surface of the sealing element against the ring element 57, and with a suitable choice of O-ring diameter and spring pressure, one is able to influence the unbalanced force with which the sealing element 61 presses against the abutment surface, and thereby obtain a desired surface pressure at the dynamic sealing surface. Thus, an optimal dynamic sealing function can be obtained.

As will be understood, the manner of operation and functional properties of the embodiment of FIG. 4 in other respects are essentially the same as for the embodiment described above, and in this respect it is therefore referred to the preceding description.

What is claimed is:

1. A swivel for use in transferring at least one fluid, comprising:

inner and outer, mutually rotatable swivel members having respective inner fluid paths communicating with each other through at least one associated annular space at an interface between the swivel members, a radially movable ring element located in a peripheral groove in a first one of the swivel members, a static seal placed between the ring element and a second one of the swivel members, a dynamic seal placed in a ring groove in the first swivel member, such that the dynamic seal is located between the ring element and side walls of the peripheral groove, so that the first swivel member is rotatable in relation to the ring element and the second swivel member, and a barrier liquid supply communicating with said static and dynamic seals, and adapted to provide a barrier liquid at a relatively higher pressure than the at least one fluid to be transferred by the swivel, to hydraulically activate said static and dynamic seals.

2. A swivel according to claim 1, wherein said barrier liquid supply is adapted to be debauched in a buffer volume which is delimited by the bottom area of the peripheral groove and the ring element, and at least one of said static and dynamic seals is adapted to communicate with the buffer volume.

3. A swivel according to claim 1, wherein said static seal comprises a U-shaped lip seal having inner and outer legs which are adapted to be directed axially along the swivel, wherein said outer leg under the influence of the barrier liquid is adapted to be pressed to frictional locking engagement with the second swivel member.

4. A swivel according to claim 1, wherein said dynamic seal comprises a pair of elastomeric U-shaped lip seals which are adapted to be placed in respective ring grooves in the first swivel member on each side of the ring element, and which have radially directed legs which, under the influence of the barrier liquid, are adapted to be pressed against the ring element and the ring groove respectively.

5. A swivel according to claim 1, wherein said dynamic seal comprises a pair of sealing elements which are adapted to be sealingly placed in respective ring grooves in the first swivel member on each side of the ring element, said barrier liquid supply is adapted to be connected to a bottom portion of each ring groove, and a mechanical spring acting upon said sealing elements in addition to the pressure from barrier liquid, said mechanical spring being adapted to be placed in the bottom portion of each ring groove.

6. A swivel according to claim 5, wherein said sealing elements are acted upon and retained by an O-ring adapted to be placed in the ring groove, and wherein the force from said mechanical spring, the diameter of said O-ring and the diameter of an abutting surface of said sealing element against the ring element are mutually adapted so that a desired magnitude of an unbalanced force with which said sealing elements press against the abutting surface is obtained.

7. A swivel for use in transferring at least one fluid, comprising:

inner and outer, mutually rotatable swivel members having respective inner fluid paths communicating with each other through at least one associated annular space at an interface between the swivel members, a peripheral groove formed in a first one of the swivel members adjacent to said annular space, a ring element placed in the peripheral groove and being dimensioned so as to be freely radially movable in the groove, a static seal placed between an axially extending surface of said ring element and a second one of the swivel members, a dynamic seal placed between the ring element and side walls of the peripheral groove, so that the first swivel member is rotatable in relation to the ring element and the second swivel member, the dynamic seal being placed in a ring groove in a side wall of said peripheral groove, and a barrier liquid supply communicating with said static and dynamic seals, for providing a barrier liquid at a relatively higher pressure than the at least one fluid to be transferred by the swivel, to hydraulically activate said static and dynamic seals.

* * * * *